No. 756,020. PATENTED MAR. 29, 1904.
H. J. HOEGH.
BELT SHIFTER.
APPLICATION FILED MAY 14, 1903.
NO MODEL. 2 SHEETS—SHEET 1.
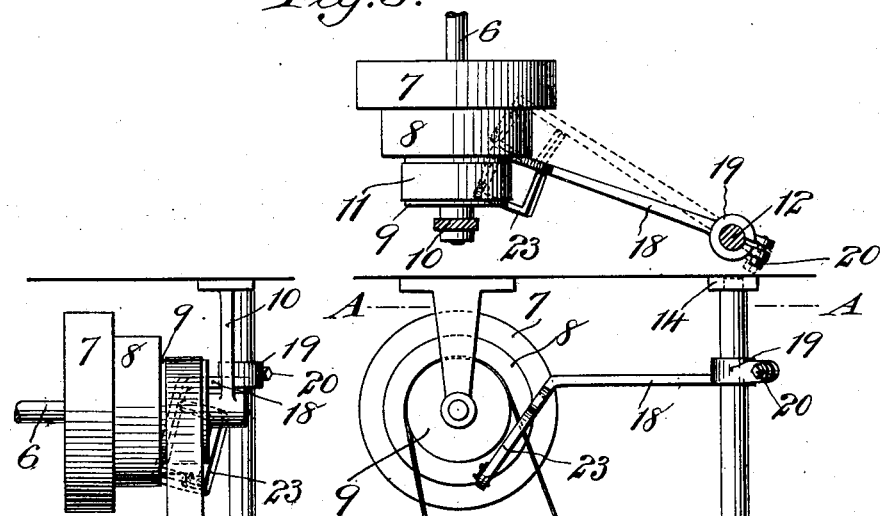
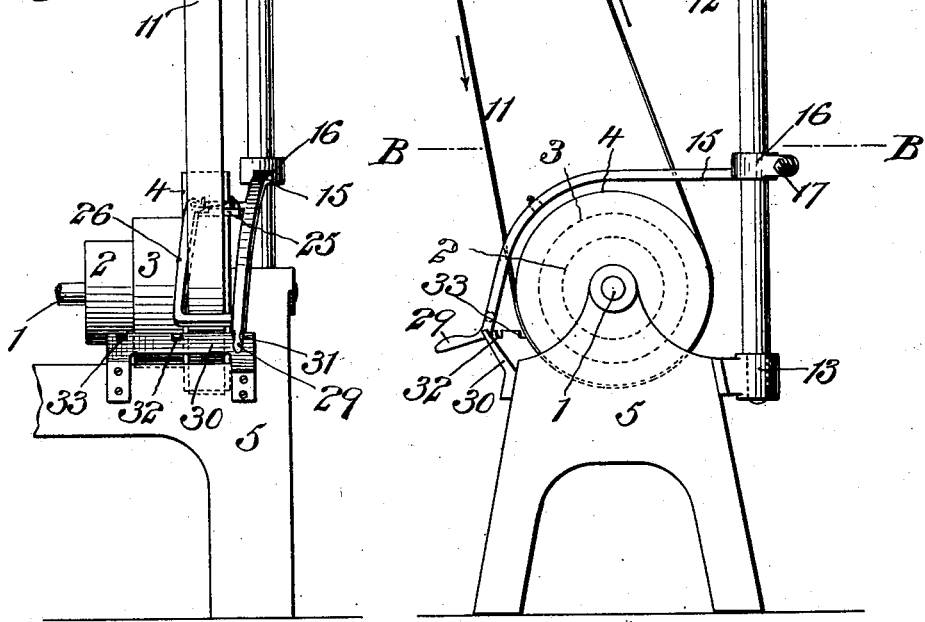
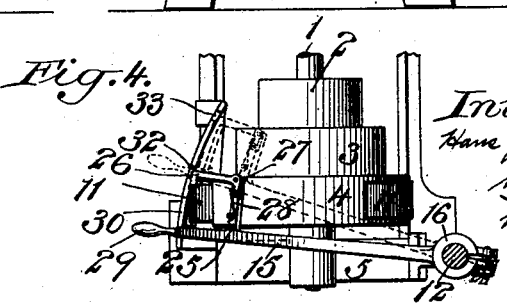
Witnesses:
George Barry Jr.
Henry Thieme
Inventor.
Hans J. Hoegh
by attorneys
Brown & Seward No. 756,020. PATENTED MAR. 29, 1904.
H. J. HOEGH.
BELT SHIFTER.
APPLICATION FILED MAY 14, 1903.
NO MODEL. 2 SHEETS—SHEET 2.
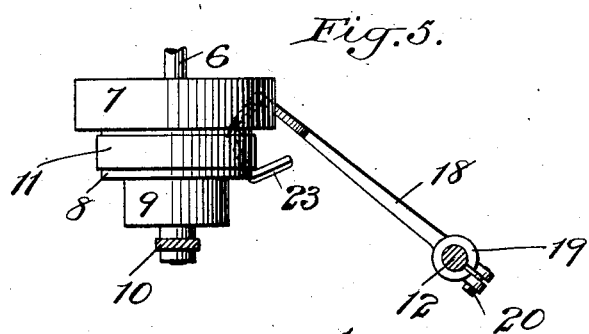
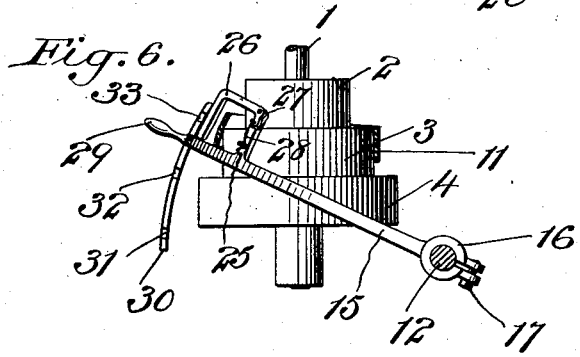
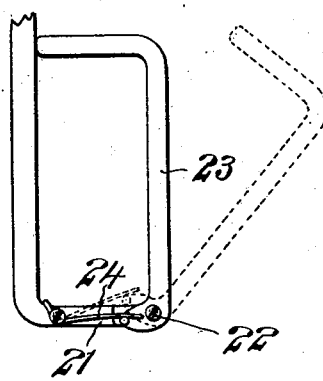
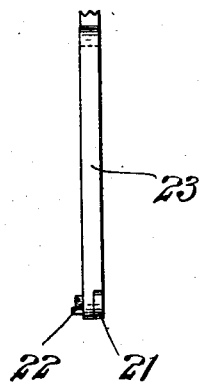
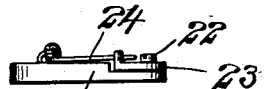
Witnesses:
George Barry Jr
Henry Thieme
Inventor:
Hans J. Hoegh
by attorneys No. 756,020. Patented March 29, 1904.

UNITED STATES PATENT OFFICE.

HANS J. HOEGH, OF PRINCESS BAY, NEW YORK.

BELT-SHIFTER.

SPECIFICATION forming part of Letters Patent No. 756,020, dated March 29, 1904.

Application filed May 14, 1903. Serial No. 157,029. (No model.)

*To all whom it may concern:*

Be it known that I, HANS J. HOEGH, a citizen of the United States, and a resident of Princess Bay, in the county of Richmond and State of New York, have invented a new and useful Belt-Shifter, of which the following is a specification.

My invention relates to belt-shifters; and it consists of a new belt-shifting device for stepped cone-pulleys by means of which the shifting of the belt from step to step upon one of the pulleys will yieldingly shift the belt from step to step upon the other pulley.

The object of my invention is to provide a device of the above character in which the belt may be positively shifted first from a larger step to a smaller step on one of the cone-pulleys and then yieldingly from a smaller step to a larger step on the other of the cone-pulleys.

A further object is to provide a belt-shifting device in which the belt-engaging arm adjacent to each pulley positively shifts the belt downwardly from step to step when the arm is swung in one direction and yieldingly shifts the belt upwardly from step to step when the arm is swung in the opposite direction, thus permitting the belt to be shifted downwardly a complete step upon one pulley before the belt is shifted upwardly one complete step upon the other pulley.

A practical embodiment of my invention is represented in the accompanying drawings, in which—

Figure 1 represents in front elevation two stepped cone-pulleys and their shafts, a belt connecting the same, and my new belt-shifting device in engagement with the belt. Fig. 2 is a view in side elevation of the same. Fig. 3 is a horizontal section taken in the plane of the line A A of Fig. 2 looking downwardly, the upper belt-shifting arm being shown in full lines in the position which it assumes when the belt is in engagement with the smallest step of the cone-pulley and in dotted lines in the position which it assumes when the belt is in engagement with the next succeeding step of the cone-pulley. Fig. 4 is a horizontal section in the plane of the line B B of Fig. 2 looking downwardly, the lower belt-shifting arm being shown in full lines in the position which it assumes when the belt is in engagement with the largest step of the cone-pulley and in dotted lines in the position which it assumes when the belt is in engagement with the next succeeding step of the cone-pulley. Fig. 5 is a view taken in the plane of the line A A of Fig. 2 looking downwardly, showing the position of the upper belt-shifting arm with reference to the upper pulley before the lower belt-shifting arm has completed its movement of shifting the belt from the intermediate step to the smallest step of the lower cone-pulley, the engagement of the belt with the intermediate step of the upper cone-pulley being disturbed because of the yielding engagement of the upper belt-shifting arm therewith. Fig. 6 is a horizontal section taken in the plane of the line B B of Fig. 2 looking downwardly, showing the position of the lower belt-shifting arm as it is positively shifting the belt from the intermediate step to the smallest step on the lower cone-pulley. Fig. 7 is a detail plan view of the outer end of one form of belt-shifting arm, showing the yielding belt-retaining piece in full lines in its closed position and in dotted lines in its open position. Fig. 8 is a side view of the same, and Fig. 9 is an end view thereof.

The shaft of the lower cone-pulley is denoted by 1, and the smallest, intermediate, and largest steps of the cone-pulley carried thereby are denoted, respectively, by 2, 3, and 4. A suitable supporting-base 5 is provided for the shaft 1. The shaft of the upper cone-pulley is denoted by 6, and the largest, intermediate, and smallest steps of the cone-pulley carried thereby are denoted, respectively, by 7, 8, and 9. A hanger 10 is shown for supporting one end of the shaft 6. A belt 11 is shown in Figs. 1 to 4, inclusive, as running on the large step 4 of the lower cone-pulley and the smaller step 9 of the upper cone-pulley.

One form of my new belt-shifting device for accomplishing yieldingly the shifting of the belt from a smaller to a larger step on one pulley when it is positively shifted from a larger to a smaller step on the other pulley is constructed, arranged, and operated as follows: An upright rock-shaft 12 is supported in a suitable step 13 at its lower end, carried by the base 5, and at its upper end by a top bearing 14. A lower belt-shifting arm 15 is adjustably secured to the rock-shaft 12 by a split collar 16 and screw 17, so that its free end engages the belt 11 as it leads onto the lower cone-pulley. The upper belt-shifting arm 18 is adjustably secured to the rock-shaft 12 by a split collar 19 and screw 20, so that its free end engages the belt 11 as it leads onto the upper cone-pulley. The pulleys and the rock-shaft 12 are so adjusted with relation to each other that the point of engagement of the upper and lower belt-shifting arms with the belt are at substantially equal distances from the axis of the rock-shaft when the belt is in engagement with the intermediate steps of the two pulleys. These two belt-shifting arms 15 and 18 are constructed to positively shift the belt downwardly step by step and yieldingly shift the belt upwardly step by step, as follows: A belt-embracing loop is formed at the outer end of the arm 18 by providing a laterally-extended branch 21, to the free end of which is hinged at 22 an L-shaped belt-retaining piece 23. A spring 24 serves to yieldingly hold the piece 23 closed. The lower arm 15 is similarly provided with a belt-embracing loop formed by the arm itself, a laterally-extended branch 25 and an L-shaped belt-retaining piece 26, hinged at 27 to the free end of the laterally-extended branch 25. A spring 28 serves to yieldingly hold the piece 26 closed. These spring-actuated yielding pieces 23 26 are arranged upon opposite sides of the arms 18 and 15, as shown. One of these arms (in the present instance the lower arm 15) is provided with an operating or shifting handle 29, arranged to coact with a notched plate 30, fixed to the supporting-base 5. This plate 30 is provided with three notches 31 32 33, arranged to engage the free end of the arm 15 when the belt is in engagement with the large, the intermediate, and the small steps, respectively, of the lower pulley.

The operation is as follows: Supposing the belt to be in engagement with the large step 4 of the lower pulley and the small step 9 of the upper pulley and it be desired to shift the belt to the intermediate steps 3 and 8 of the two pulleys, the handle 29 and its arm 15 is removed from its engagement with the notch 31 and shifted laterally into engagement with the notch 32. The arm 15 will engage the edge of the belt 11 and positively shift the belt onto the intermediate step 3 of the lower pulley. The yielding piece 23 of the upper arm 18 will yield as the lower end of the belt is being shifted, and the belt will thus be retained upon the small step 9 of the upper pulley until a sufficient slack has been obtained by the complete shifting of the lower end of the belt onto the intermediate step 3 of the lower pulley. The spring-tension of the yielding piece 23 is then sufficient to cause the yielding piece 23 to close against the arm 18, and thus shift the upper end of the belt onto the intermediate step 8 of the upper pulley. If it is desired to shift back again into the original position, the operation is reversed and the upper end of the belt is first shifted positively and then the lower end yieldingly. The portions of the arms which engage the belts adjacent to the pulleys are caused to engage the belts at a sharp angle downwardly, and the arms are arranged at about right angles to the taper line of the pulleys, so that the movement of the portions of the arms which engage the belts will be substantially parallel to the taper line of the pulleys for insuring the yielding shifting of the belt by its tendency to travel up along the inclined edges of the yielding pieces of the arms.

While I have shown an open belt in the accompanying drawings as connecting the two cone-pulleys, it is obvious that the belt-shifting device could be equally well employed with a cross-belt, it being understood that the points of engagement of the arms with the belt should be adjacent to the points where the belt runs onto the said pulleys.

It is evident that many different forms might be employed for shifting the belt other than that shown and described therein. Hence I do not wish to limit myself to the structure herein shown and described; but

What I claim is—

1. The combination with two stepped cone-pulleys and their belt, of a rock-shaft, two belt-shifting arms fixed thereto one adjacent to each pulley, one of the arms being fitted to shift the belt positively in one direction and the other arm being fitted to yieldingly shift the belt when rocked in the same direction.

2. The combination with two stepped cone-pulleys and their belt, of a belt-shifting arm adjacent to each pulley and independent means carried by each of the arms for permitting the belt to be positively shifted when the arm is moved in one direction and yieldingly shifted when the arm is moved in the other direction.

3. The combination with two stepped cone-pulleys and their belt, of a rock-shaft, two belt-shifting arms fixed thereto, one adjacent to each pulley, and independent means carried by the arm for permitting the belt to be positively shifted when the arm is moved in one direction and yieldingly shifted when the arm is moved in the other direction.

4. The combination with two stepped cone-pulleys and their belt, of a belt-shifting arm adjacent to each pulley and independent means carried by each arm for permitting the belt to be positively shifted downwardly and yieldingly shifted upwardly on the pulley comprising a spring-actuated belt-retaining piece hinged to the said arm.

In testimony that I claim the foregoing as my invention I have signed my name, in presence of two witnesses, this 13th day of May, 1903.

HANS J. HOEGH.

Witnesses:
   FREDK. HAYNES,
   HENRY THIEME.